US008192103B2

(12) United States Patent
Tsai (10) Patent No.: US 8,192,103 B2
(45) Date of Patent: Jun. 5, 2012

(54) EASILY ASSEMBLED SWIVEL MOUNT DEVICE

(76) Inventor: Jen-Chu Tsai, Taichung (TW)

( * ) Notice: Subject to any disclaimer, the term of this patent is extended or adjusted under 35 U.S.C. 154(b) by 244 days.

(21) Appl. No.: 12/647,946

(22) Filed: Dec. 28, 2009

(65) Prior Publication Data

US 2010/0166495 A1   Jul. 1, 2010

(30) Foreign Application Priority Data

Dec. 31, 2008 (TW) .............................. 97151637 A
Aug. 27, 2009 (TW) .............................. 98128809 A (51) Int. Cl.
*F16D 3/00* (2006.01)

(52) U.S. Cl. .......... 403/72; 403/114; 403/146; 403/332; 81/177.75

(58) Field of Classification Search ............ 403/72, 403/73, 76, 113, 114, 144, 145, 146, 150, 403/154, 332, 375; 81/177.75, 177.85
See application file for complete search history.

(56) References Cited

U.S. PATENT DOCUMENTS

| 3,182,345 | A | * | 5/1965 | Smith | 403/375 |
| 3,503,586 | A | * | 3/1970 | Bordes | 251/266 |
| 4,708,318 | A | * | 11/1987 | Simo | 403/375 |
| 4,832,573 | A | * | 5/1989 | Dorski | 403/375 |
| 4,936,701 | A | * | 6/1990 | Allen et al. | 403/114 |
| 5,738,586 | A | * | 4/1998 | Arriaga | 81/177.75 |
| 6,145,416 | A | * | 11/2000 | Bonniot | 81/177.75 |
| 2003/0170070 | A1 | * | 9/2003 | Mills et al. | 403/154 |

* cited by examiner

*Primary Examiner* — Michael P Ferguson
(74) *Attorney, Agent, or Firm* — Steven B. Philips; Moore & Van Allen PLLC (57) ABSTRACT

An easily assembled swivel mount device includes a housing having a peripheral shoulder abutment and a peripheral ramp which extends toward the shoulder abutment and which terminates at a peripheral blocking protrusion, a swivel member swivelably mounted on the housing by means of a shaft, and a sleeve member having a leading abutment edge which is brought to abut against the shoulder abutment, and an inner peripheral guideway which extends away from the leading abutment edge and which terminates at a peripheral blocked ledge such that the blocked ledge can be retained behind the blocking protrusion after slipping over the peripheral ramp.

6 Claims, 7 Drawing Sheets

FIG. 7

EASILY ASSEMBLED SWIVEL MOUNT DEVICE

CROSS-REFERENCE TO RELATED APPLICATION

This application claims priority of Taiwanese patent Application No. 097151637, filed on Dec. 31, 2008, and Taiwanese patent Application No. 098128809, filed on Aug. 27, 2009, which claims priority of said Taiwanese patent Application No. 097151637, the disclosures of which are herein incorporated by reference.

BACKGROUND OF THE INVENTION

1. Field of the Invention

This invention relates to a swivel mount device, more particularly to a ball-type swivel joint in which a ball-type swivel member is connected to a housing by a shaft.

2. Description of the Related Art

Figure 1:
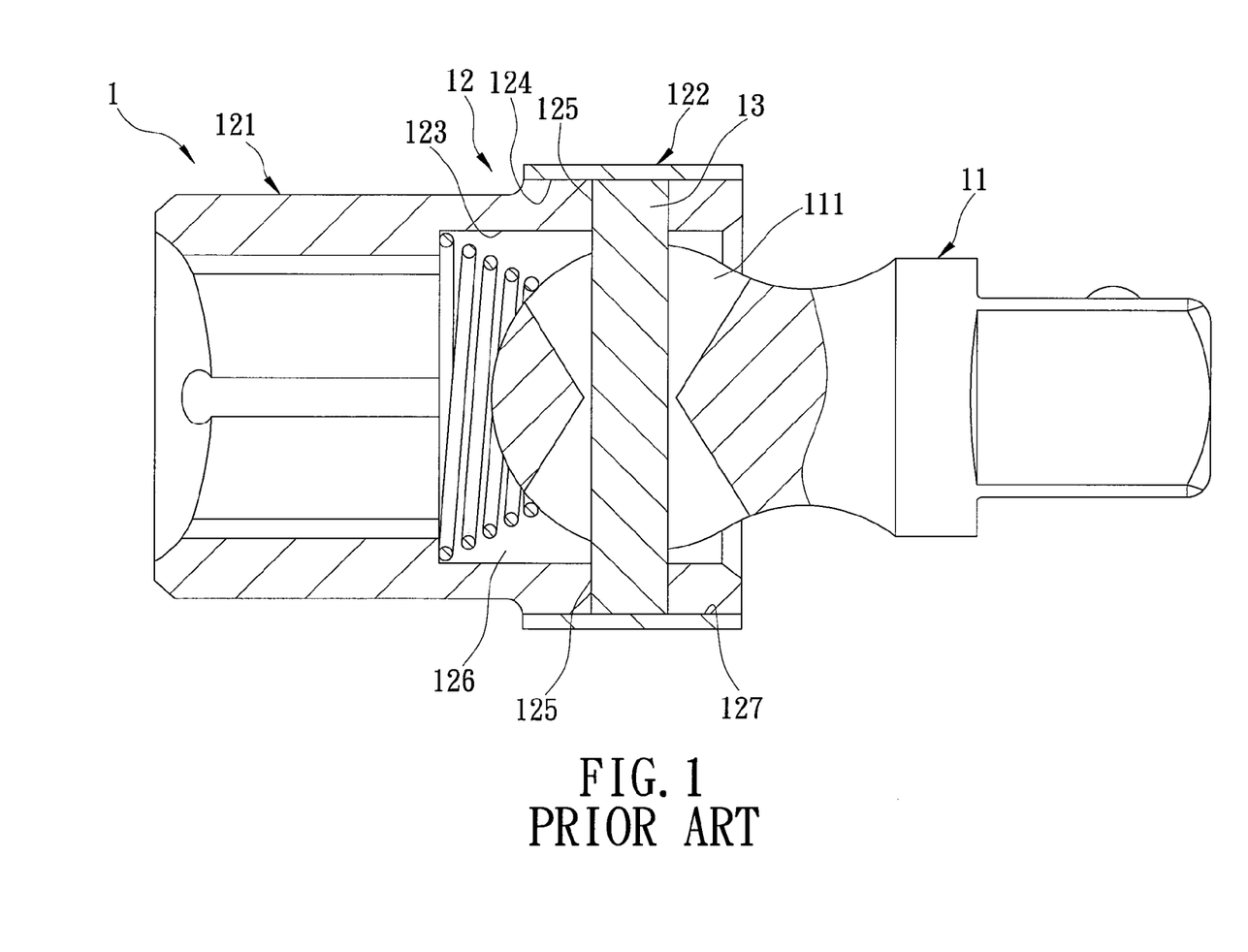
FIG. 1 is a schematic sectional view of a conventional swivel joint.

Referring to FIG. 1, a conventional swivel joint 1 is shown to include a swivel member 11, a housing unit 12, and a shaft 13. The swivel member 11 has a through hole 111. The housing unit 12 includes a housing 121 and a sleeve 122. The housing 121 has inner and outer tubular surfaces 123, 124, and two bearing holes 125 each extending through the inner tubular surface 123 and the outer tubular surface 124. The inner tubular surface 123 defines an accommodation chamber 126. The sleeve 122 has an inner sleeve wall surface 127 fittingly sleeved on the outer tubular surface 124. The shaft 13 extends through the through hole 111 and has two ends inserted respectively into the bearing holes 125 and retained by the sleeve 122. The inner sleeve wall surface 127 of the sleeve 122 is configured to match the outer tubular surface 124 of the housing 121 so that a tolerance therebetween is approximately 0, and can be sleeved fittingly on the housing 121 by a strong pressing force applied by a hydraulic press machine without any welding process. However, the following drawbacks arise:

1. The strong pressing force applied by the hydraulic press machine may scratch the outer surface of the swivel joint 1.

2. The sleeve 122 may be loosened and slip from the housing 121 after long-term use.

Figure 2:
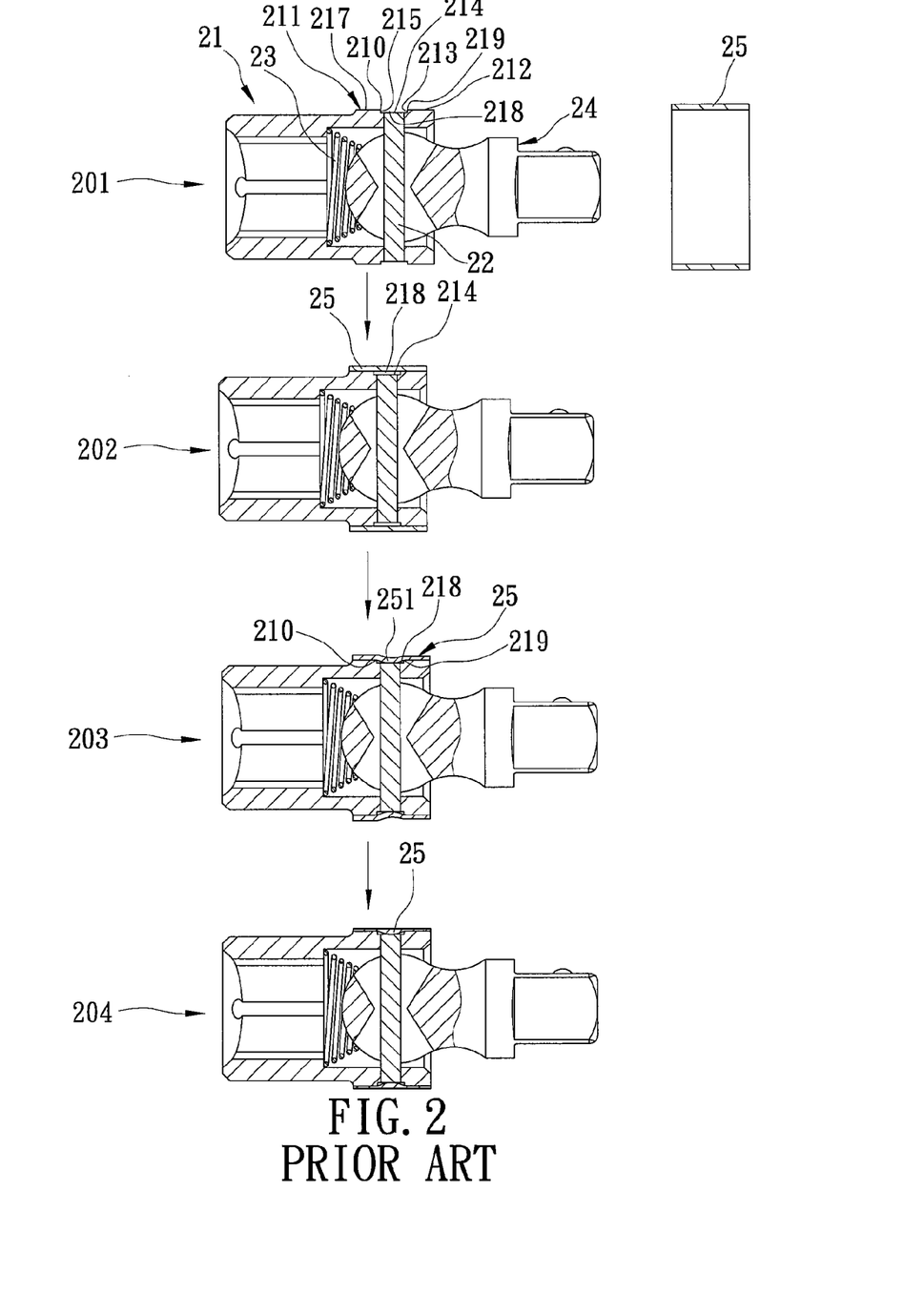
FIG. 2 is a schematic view showing how another conventional swivel joint is fabricated.

Reference is made to FIG. 2, which illustrates how another conventional swivel joint 2 is fabricated:

In step 201, a housing 21, a shaft 22, a coil spring 23, and a swivel member 24 are assembled. The housing 21 has an outer tubular surface 211 which includes an entry segment 212, a first shoulder abutment 213, a concaved segment 214, a second shoulder abutment 215, and a barrier segment 217 which are arranged in sequence. The first and second shoulder abutments 213, 215 and the concaved segment 214 cooperatively define an annular groove 218. A first retaining corner 219 is formed between the first shoulder abutment 213 and the entry segment 212, and a second training corner 210 is formed between the second shoulder abutment 215 and the barrier segment 217.

In step 202, a sleeve 25 which has an inner diameter larger than the outer diameter of the concaved segment 214 is sleeved on the housing 21.

In step 203, a press machine is used to press a middle part of the sleeve 25 into the annular groove 218 such that the sleeve 25 is provided with a protrusion 251 that is disposed in the annular groove 218, and that has two ends abutting against the first and second retaining corners 219, 210, respectively.

In step 204, the sleeve 25 is subjected to surface treatment to smooth the outer surface thereof.

However, since surface treatment is required after all component parts of the swivel joint 2 are assembled, the manufacturing process is complicated. Moreover, chemical agents used in the surface treatment process may corrode the swivel member 24 and the shaft 22, so that swiveling of the swivel member 24 relative to the housing 21 may not be smooth.

SUMMARY OF THE INVENTION

An object of the present invention is to provide a swivel mount device which is easily assembled, reliable, and smoothly swivel, and which has a good outer appearance.

According to this invention, the swivel mount device includes a housing, a shaft, a swivel member, and a sleeve member. The housing includes a tubular wall which surrounds an axis in an axial direction, and which has an open end defining an opening. The tubular wall has an inner tubular surface which defines an accommodation chamber in spatial communication with the opening, and an outer tubular surface which has entry-side and barrier-side regions relative to the open end, and a transition region interposed therebetween. The transition region has two bearing holes extending through the inner tubular surface to be communicated with the accommodation chamber. The tubular wall has a peripheral shoulder abutment extending radially from the barrier-side region, and a peripheral ramp disposed on one of the entry-side and barrier-side regions. The peripheral ramp extends to terminate at a peripheral blocking edge which cooperates with the one of the entry-side and barrier-side regions to form a peripheral blocking protrusion. The shaft has two opposite ends inserted into and journalled in the bearing holes, respectively. The swivel member has a mount end disposed outwardly of the open end, and a swivel ball body which has a through hole and which is inserted through the opening into the accommodation chamber. The sleeve member has a leading abutment edge configured to abut against the shoulder abutment, and an inner sleeve wall surface which confronts the outer tubular surface and which has leading, middle and trailing regions that correspond to the barrier-side, transition and entry-side regions, respectively. The inner sleeve wall surface has an inner peripheral guideway extending away from the leading abutment edge to terminate at a peripheral blocked ledge. When the leading abutment edge is brought to abut against the peripheral shoulder abutment by virtue of sleeving of the sleeve member on the tubular wall from the entry-side region, the peripheral blocked ledge is brought to slip over the peripheral blocking edge so as to be retained behind the peripheral blocking protrusion.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Figure 3:
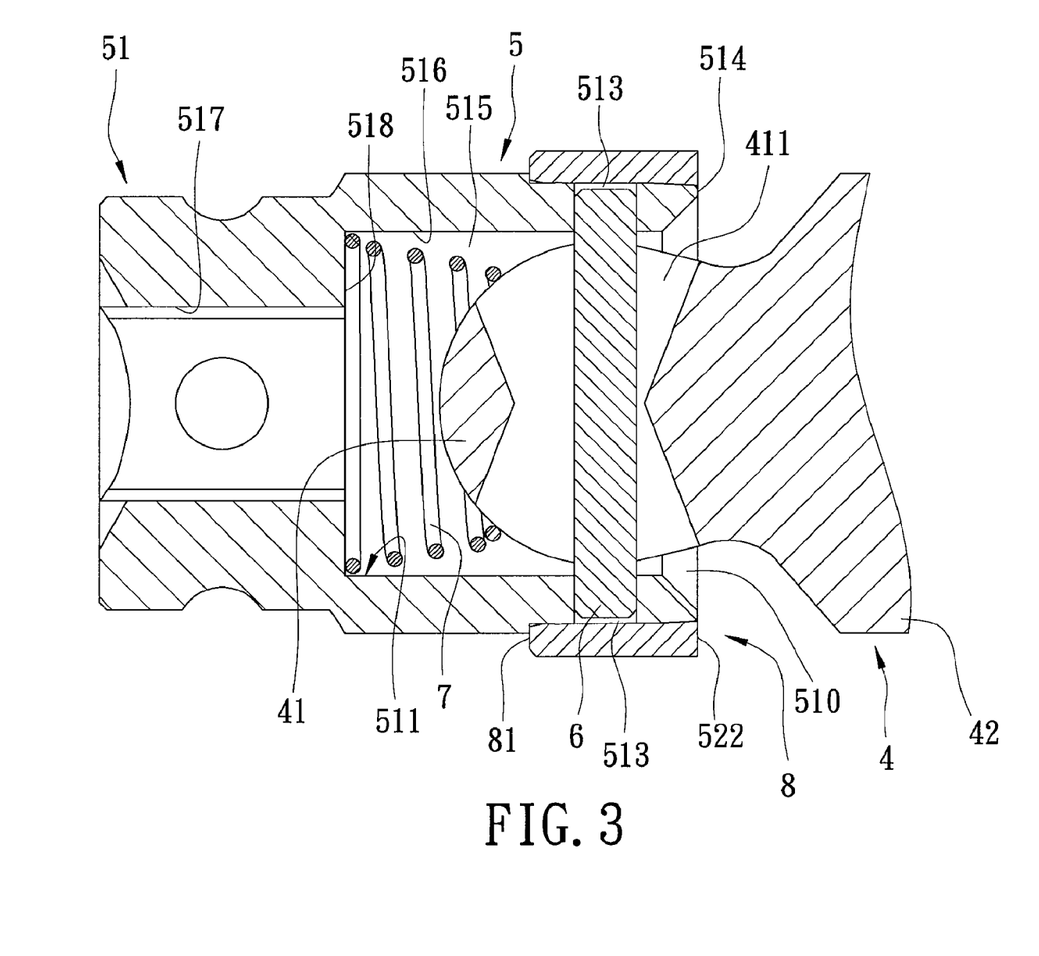
FIG. 3 is a fragmentary sectional view of the first preferred embodiment of a swivel mount device according to this invention.
Figure 4:
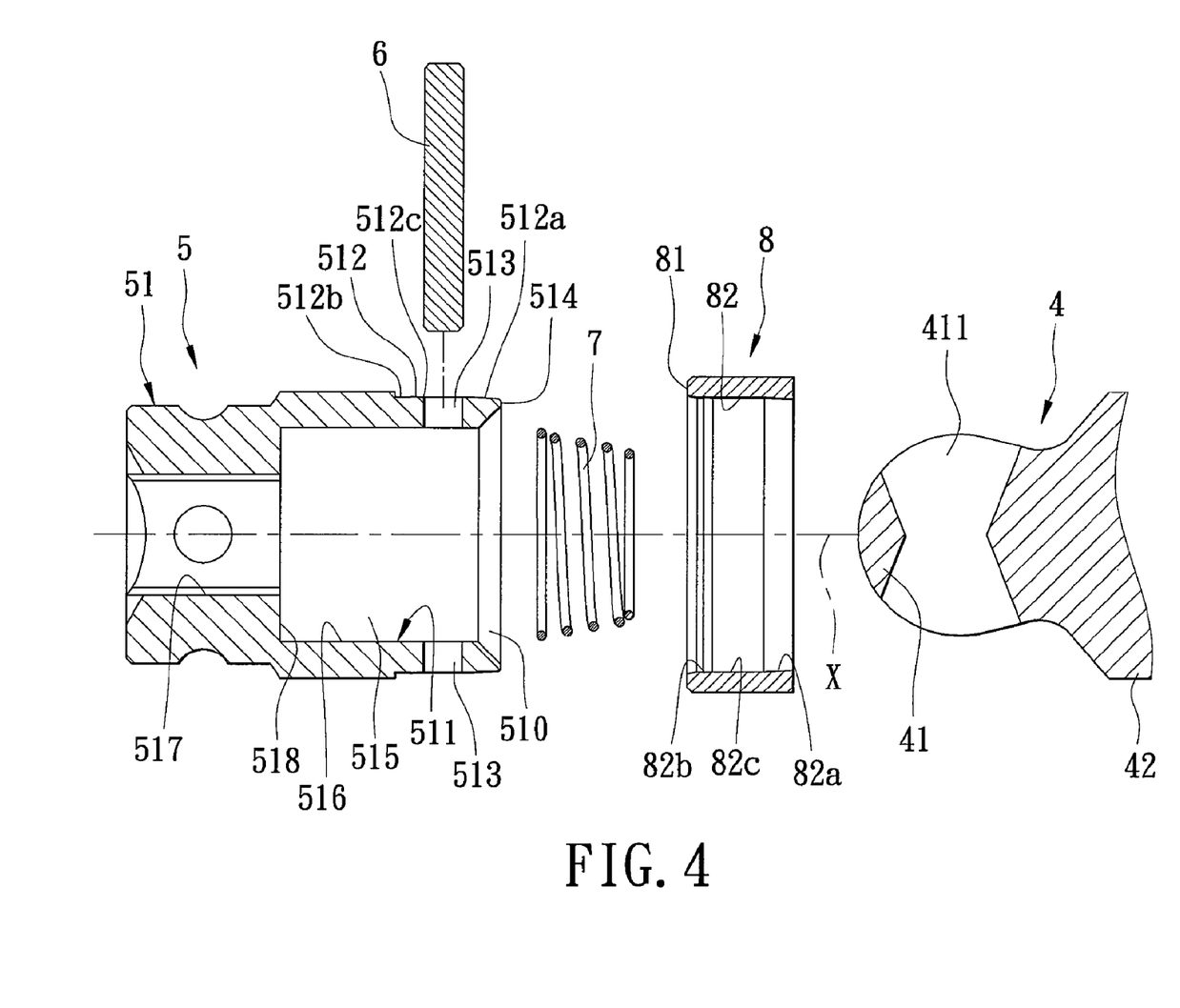
FIG. 4 is an exploded sectional view of the first preferred embodiment.
Figure 5:
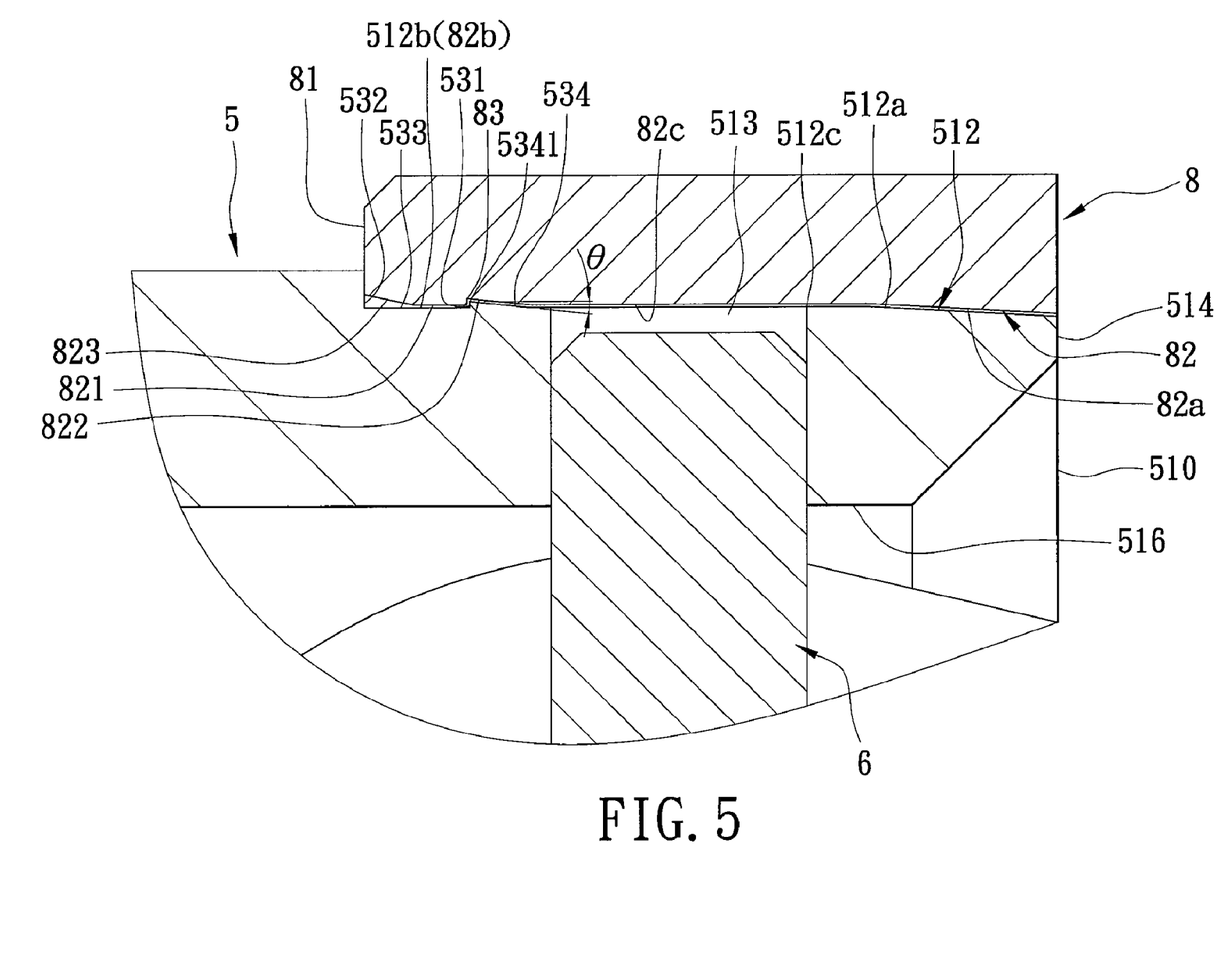
FIG. 5 is an enlarged sectional view of a portion of the first preferred embodiment.

Referring to FIGS. 3 to 5, the first preferred embodiment of an easily assembled swivel mount device according to the present invention is shown to comprise a housing 5, a shaft 6, a swivel member 4, a positioning member 7, and a sleeve member 8.

The housing 5 includes a tubular wall 51 which surrounds an axis (X) in an axial direction, and which has an open end 514 that faces forwardly and that has an opening 510. The tubular wall 51 has an inner tubular surface 511 which includes a larger-diameter head segment 516 that defines an accommodation chamber 515 in spatial communication with the opening 510, and a smaller-diameter body segment 517 extending from the head segment 516 to be connected to a hand tool (not shown), such as an electric or pneumatic tool, a wrench, etc. A shoulder 518 is formed between the head and body segments 516,517. The tubular wall 51 further has an outer tubular surface 512 which is radially opposite to the inner tubular surface 511, and which has entry-side and barrier-side regions (512a, 512b) relative to the open end 514, and a transition region (512c) interposed between the entry-side and barrier-side regions (512a, 512b). The transition region (512c) has two bearing holes 513 which extend through the inner tubular surface 511 to be communicated with the accommodation chamber 515, and which are aligned with each other.

The tubular wall 51 further has a peripheral shoulder abutment 532 which extends radially from the barrier-side region (512b) by a first distance, and which faces forwardly, and a peripheral ramp 534 which is disposed on the barrier-side region (512b) and which extends rearwardly and divergently from the transition region (512c) toward the peripheral shoulder abutment 532 to terminate at a peripheral blocking edge 5341. The peripheral blocking edge 5341 cooperates with the barrier-side region (512b) to form a peripheral blocking protrusion 531 that confronts the peripheral shoulder abutment 532 in the axial direction, and that defines a second distance shorter than the first distance. Hence, the peripheral blocking protrusion 531 is interposed between the peripheral ramp 534 and the peripheral shoulder abutment 532. In addition, the outer tubular surface 512 of the housing 5 further has an engaging segment 533 which extends axially between the peripheral shoulder abutment 532 and the peripheral blocking protrusion 531. For example, the second distance of the peripheral blocking protrusion 531 is 0.05 mm to 0.1 mm, and an inclined angle (θ) of the peripheral ramp 534 is about 3 degrees.

The shaft 6 has two opposite ends configured to be inserted into and journalled in the bearing holes 513, respectively.

The swivel member 4 has a mount end 42 which is disposed outwardly of the open end 514, and a swivel ball body 41 having a through hole 411. The swivel ball body 41 is configured to be inserted through the opening 510 into the accommodation chamber 515 such that, after the shaft 6 is inserted through the through hole 411 with the ends of the shaft 6 respectively journalled in the bearing holes 513, the swivel ball body 41 is swivelable in the accommodation chamber 515 and is guarded against movement out of the chamber 515. The positioning member 7 is a coil spring, and is disposed in the accommodation chamber 515 to abut against the shoulder 518 and the swivel ball body 41 so that the swivel ball body 41 is retainingly slidable relative to the positioning member 7.

The sleeve member 8 has a leading abutment edge 81, and is configured to be sleeved on the tubular wall 51 of the housing 5. Specifically, the sleeve member 8 has an inner sleeve wall surface 82 which confronts the outer tubular surface 512 of the housing 5, and which has leading, middle and trailing regions (82b, 82c, 82a) that correspond to the barrier-side, transition and entry-side regions (512b, 512c, 512a), respectively.

The inner sleeve wall surface 82 has an inner peripheral guideway 821 which is disposed on the leading region (82b) and which extends away from the leading abutment edge 81 to terminate at a peripheral blocked ledge 83 that faces away from the leading abutment edge 81. The inner sleeve wall surface 82 further has a compliant segment 822 which is disposed on the leading region (82b) and which extends from the peripheral blocked ledge 83 opposite to the inner peripheral guideway 821, and a flared segment 823 which extends divergently from the inner peripheral guideway 821 to the leading abutment edge 81.

In assembling the swivel mount device according to this embodiment, the swivel ball body 41, the shaft 6, and the coil spring 7 are mounted on the housing 5, and the sleeve member 8 is axially sleeved on the housing 5. Specifically, when the leading abutment edge 81 of the sleeve member 8 is brought to abut against the peripheral shoulder abutment 532 by virtue of sleeving of the sleeve member 8 on the tubular wall 51 from the entry-side region (512a), the peripheral blocked ledge 83 is brought to slip over the peripheral blocking edge 5341 so as to be retained behind the peripheral blocking protrusion 531, the inner peripheral guideway 821 is engaged with the engaging segment 533, and the compliant segment 822 is compliantly and fittingly engaged with the peripheral ramp 534.

Due to the flared segment 823, the sleeve member 8 can be easily sleeved on the housing 5 to facilitate slipping of the peripheral blocked ledge 83 over the peripheral blocking edge 5341 with the application of a relatively small pressing force using a plastic hammer. As a result, assembly of the swivel mount device can be conveniently performed.

As illustrated, the swivel mount device according to this invention has the following advantages:

1. Since the sleeve member 8 can be sleeved on the housing by applying a relatively small pressing force, scratching of the outer surface of the sleeve member 8 can be prevented.

2. Since the sleeve member 8 is positioned on the housing 5 by the abutting engagement between the leading abutment edge 81 and the shoulder abutment 532, and by the abutting engagement between the blocked ledge 83 and the peripheral blocking protrusion 531 instead of by a press-fit manner, slippage of the sleeve member 8 from the housing 5 can be prevented.

3. During assembly of the swivel mount device of this invention, neither surface treatment nor working machine is needed. Thus, assembly is simplified and rendered convenient, and corrosion problems associated with surface treatment can be eliminated.

4. Since the sleeve member 8 and the housing 5 can be fabricated individually to have different colors, the outer appearance of the swivel mount device of this invention can be improved.

Figure 6:
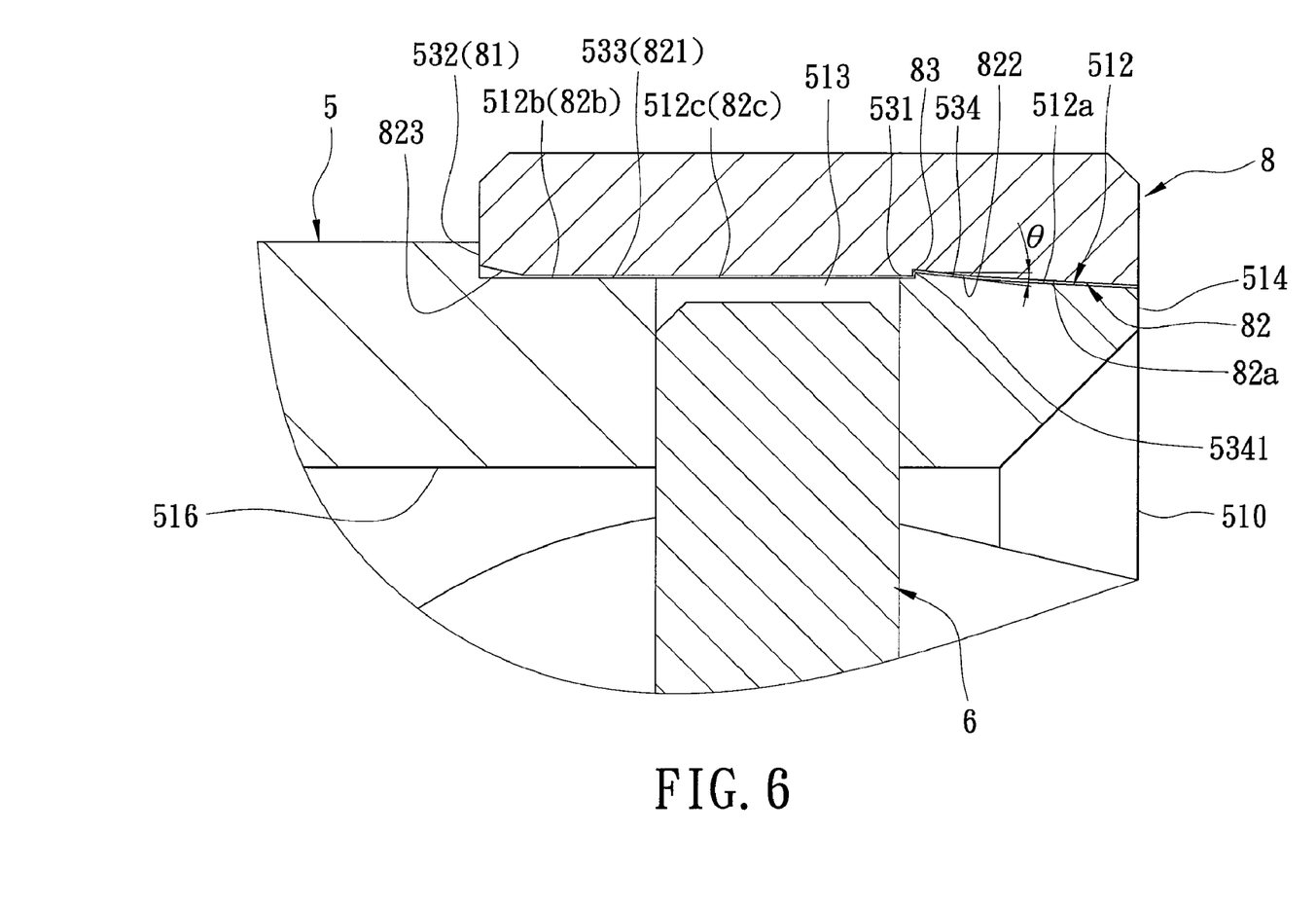
FIG. 6 is an enlarged sectional view of a portion of the second preferred embodiment of a swivel mount device according to this invention.

Referring to FIG. 6, the second preferred embodiment of a swivel mount device according to this invention is similar to the above embodiment in construction. In the second embodiment, the peripheral ramp 534 is disposed on the entry-side region (512a). The engaging segment 533 extends axially between the peripheral shoulder abutment 532 and the peripheral blocking protrusion 531 from the barrier-side region (512b) to the entry-side region (512a). The inner peripheral guideway 821 is disposed on the trailing region (82a) and extends along the middle and leading regions (82c, 82b) to be engaged with the engaging segment 533 when the leading abutment edge 83 abuts against the peripheral shoulder abutment 532. The flared segment 823 extends divergently from the inner peripheral guideway 821 to the leading abutment edge 81 to facilitate slipping of the peripheral blocked ledge 83 over the peripheral blocking edge 5341. Since the peripheral ramp 534 is disposed on the entry-side region (512a), the distance over which the sleeve member 8 is moved by a hammering force during sleeving of the sleeve member 8 on the housing 5 is longer than that in the first embodiment.

Figure 7:
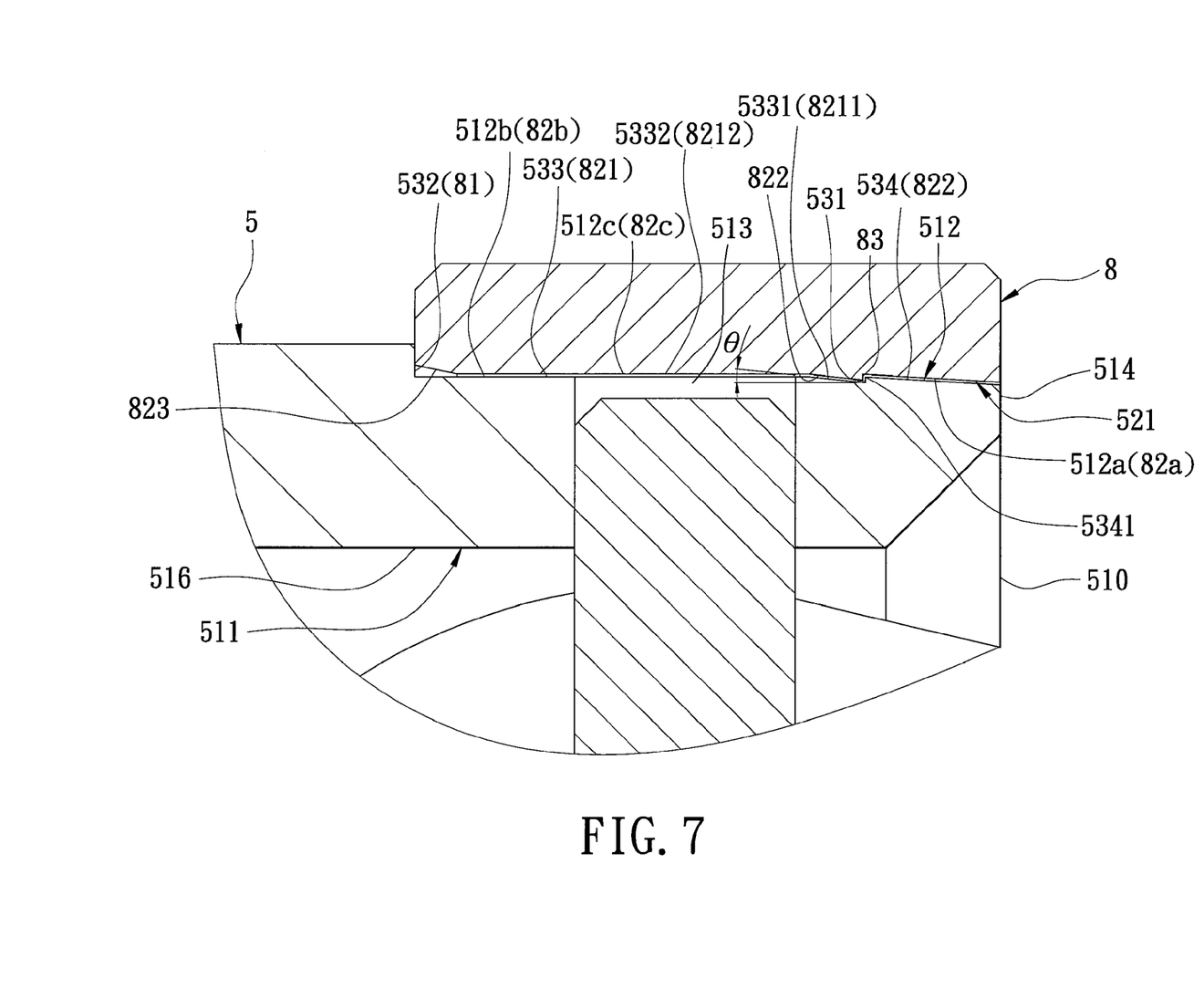
FIG. 7 is an enlarged sectional view of a portion of the third preferred embodiment of a swivel mount device according to this invention.

Referring to FIG. 7, the third preferred embodiment of a swivel mount device according to this invention is similar to the second embodiment in construction. In the third embodiment, the engaging segment 533 of the housing 5 includes an outer frusto-conical sub-segment 5331 which extends divergently from the peripheral blocking protrusion 531, and an outer cylindrical sub-segment 5332 which extends from the outer frusto-conical sub-segment 5331 and toward the peripheral shoulder abutment 532. The inner peripheral guideway 821 of the sleeve member 8 includes an inner truncated conical sub-segment 8211 and an inner cylindrical sub-segment 8212 which are configured to be compliantly matched with the outer frusto-conical sub-segment 5331 and the outer cylindrical segment 5332, respectively, when the leading abutment edge 81 abuts against the peripheral shoulder abutment 532. An inclined angle (θ) of the outer frusto-conical sub-segment 5331 is about 3 degrees.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. An easily assembled swivel mount device comprising:
a housing including a tubular wall which surrounds an axis in an axial direction, and which has an open end that faces forwardly and that has an opening, said tubular wall having an inner tubular surface which defines an accommodation chamber that is in spatial communication with said opening, and an outer tubular surface which is radially opposite to said inner tubular surface, and which has an entry-side region adjacent said open end and a barrier-side region adjacent an opposing end of said housing, and a transition region interposed between said entry-side and barrier-side regions, said transition region having two bearing holes which extend through said inner tubular surface to be communicated with said accommodation chamber,
said tubular wall having a peripheral shoulder abutment which extends radially from said barrier-side region and which faces forwardly,
said outer tubular surface of said tubular wall having a peripheral ramp axially forwardly spaced from said peripheral shoulder abutment which extends divergently and towards said peripheral shoulder abutment to terminate at a peripheral blocking edge, said peripheral blocking edge cooperating with said outer tubular surface to form a peripheral blocking protrusion that is interposed between said peripheral ramp and said peripheral shoulder abutment and that faces said peripheral shoulder abutment in the axial direction;
a shaft having two opposite ends which are configured to be inserted into and journalled in said bearing holes, respectively;
a swivel member having a mount end which is disposed outwardly of said open end, and a swivel ball body which is inserted through said opening into said accommodation chamber, and which has a through hole for insertion of said shaft; and
a sleeve member having a leading abutment edge, and configured to be sleeved on said tubular wall, said sleeve member having an inner sleeve wall surface which confronts said outer tubular surface, and which has leading, middle and trailing regions that correspond to said barrier-side, transition and entry-side regions, respectively,
said inner sleeve wall surface having an inner peripheral guideway which extends away from said leading abutment edge and which terminates at a peripheral blocked ledge that faces away from said leading abutment edge and that is configured such that, once said leading abutment edge is brought to abut against said peripheral shoulder abutment by virtue of sleeving of said sleeve member on said tubular wall from said entry-side region, said peripheral blocked ledge is brought to slip over said peripheral blocking edge so as to be retained to said peripheral blocking protrusion;
said inner sleeve wall surface having a compliant segment which extends from said peripheral blocked ledge opposite to said inner peripheral guideway, and which is configured to be compliantly and fittingly engaged with said peripheral ramp.

2. The easily assembled swivel mount device according to claim 1, wherein:
said peripheral ramp is disposed on said barrier-side region,
said outer tubular surface of said housing having an engaging segment which extends axially between said peripheral shoulder abutment and said peripheral blocking protrusion,
said inner peripheral guideway being disposed on said leading region, and being brought to be engaged with said engaging segment when said leading abutment edge abuts against said peripheral shoulder abutment,
said leading region having a flared segment which extends divergently from said inner peripheral guideway to said leading abutment edge and which is configured to facilitate slipping of said peripheral blocked ledge over said peripheral blocking edge.

3. The easily assembled swivel mount device according to claim 1, wherein:
said peripheral ramp is disposed on said entry-side region,
said outer tubular surface of said housing having an engaging segment which extends axially between said peripheral shoulder abutment and said peripheral blocking protrusion,
said inner peripheral guideway being disposed on said trailing region and extending along said middle and leading regions to be engaged with said engaging segment when said leading abutment edge abuts against said peripheral shoulder abutment, said leading region having a flared segment which extends divergently from said inner peripheral guideway to said leading abutment edge and which is configured to facilitate slipping of said peripheral blocked ledge over said peripheral blocking edge.

4. The easily assembled swivel mount device according to claim 1, further comprising a positioning member which is disposed in said accommodation chamber and which is configured to permit said swivel ball body to be retainingly slidable relative thereto.

5. The easily assembled swivel mount device according to claim 1, wherein said peripheral shoulder abutment defines a first radial distance, and said peripheral blocking protrusion defines a second radial distance that is shorter than the first radial distance.

6. An easily assembled swivel mount device comprising:
a housing including a tubular wall which surrounds an axis in an axial direction, and which has an open end that faces forwardly and that has an opening, said tubular wall having an inner tubular surface which defines an accommodation chamber that is in spatial communication with said opening, and an outer tubular surface which is radially opposite to said inner tubular surface, and which has an entry-side region adjacent said open end and a barrier-side region adjacent an opposing end of said housing, and a transition region interposed between said entry-side and barrier-side regions, said transition region having two bearing holes which extend through said inner tubular surface to be communicated with said accommodation chamber,
said tubular wall having a peripheral shoulder abutment which extends radially from said barrier-side region and which faces forwardly,
said outer tubular surface of said tubular wall having a peripheral ramp axially forwardly spaced from said peripheral shoulder abutment which is disposed on said entry-side region, and which extends divergently and towards said peripheral shoulder abutment to terminate at a peripheral blocking edge, said peripheral blocking edge cooperating with said outer tubular surface to form a peripheral blocking protrusion that is interposed between said peripheral ramp and said peripheral shoulder abutment and that faces said peripheral shoulder abutment in the axial direction, and an engaging segment which extends axially between said peripheral shoulder abutment and said peripheral blocking protrusion;
a shaft having two opposite ends which are configured to be inserted into and journalled in said bearing holes, respectively;
a swivel member having a mount end which is disposed outwardly of said open end, and a swivel ball body which is inserted through said opening into said accommodation chamber, and which has a through hole for insertion of said shaft; and
a sleeve member having a leading abutment edge, and configured to be sleeved on said tubular wall, said sleeve member having an inner sleeve wall surface which confronts said outer tubular surface, and which has leading, middle and trailing regions that correspond to said barrier-side, transition and entry-side regions, respectively;
said inner sleeve wall surface having an inner peripheral guideway which is disposed on said trailing region, which extends along said middle and leading regions to be engaged with said engaging segment, and which terminate at a peripheral blocked ledge that is configured such that, once said leading abutment edge is brought to abut against said peripheral shoulder abutment by virtue of sleeving of said sleeve member on said tubular wall from said entry-side region, said peripheral blocked ledge is brought to slip over said peripheral blocking edge so as to be retained to said peripheral blocking protrusion;
said leading region having a flared segment which extends divergently from said inner peripheral guideway to said leading abutment edge and which is configured to facilitate slipping of said peripheral blocked ledge over said peripheral blocking edge;
said engaging segment of said outer tubular surface of said housing including an outer frusto-conical sub-segment which extends divergently from said blocking protrusion, and an outer cylindrical sub-segment which extends from said outer frusto-conical sub-segment and toward said peripheral shoulder abutment;
said inner peripheral guideway including an inner frusto-conical sub-segment and an inner cylindrical sub-segment which are configured to be compliantly mated with said outer frusto-conical sub-segment and said outer cylindrical segment, respectively, when said leading abutment edge abuts against said peripheral shoulder abutment.

* * * * *